United States Patent
Francis

(10) Patent No.: US 8,096,129 B2
(45) Date of Patent: Jan. 17, 2012

(54) FUEL DISTRIBUTION APPARATUS

(75) Inventor: Oliver J. Francis, Highbridge (GB)

(73) Assignee: Rolls-Royce PLC, London (GB)

( * ) Notice: Subject to any disclaimer, the term of this patent is extended or adjusted under 35 U.S.C. 154(b) by 593 days.

(21) Appl. No.: 12/289,840

(22) Filed: Nov. 5, 2008

(65) Prior Publication Data
US 2009/0158743 A1 Jun. 25, 2009

(30) Foreign Application Priority Data
Dec. 19, 2007 (GB) .................................. 0724645.7

(51) Int. Cl.
F02C 1/00 (2006.01)
(52) U.S. Cl. ............................................. 60/734; 60/740
(58) Field of Classification Search ............ 60/746–748, 60/734, 739–742; 239/399, 404, 405
See application file for complete search history.

(56) References Cited

U.S. PATENT DOCUMENTS

| 1,713,357 | A | * | 5/1929 | Moffat | 239/464 |
| 2,801,881 | A | * | 8/1957 | Campbell | 239/464 |
| 5,685,139 | A | * | 11/1997 | Mick et al. | 60/776 |
| 6,276,141 | B1 | * | 8/2001 | Pelletier | 60/740 |
| 6,289,676 | B1 | * | 9/2001 | Prociw et al. | 60/740 |
| 7,174,717 | B2 | * | 2/2007 | Prociw | 60/740 |
| 2005/0144952 | A1 | * | 7/2005 | Prociw | 60/740 |
| 2007/0157616 | A1 | * | 7/2007 | Hernandez et al. | 60/740 |
| 2007/0163263 | A1 | * | 7/2007 | Thomson | 60/773 |

FOREIGN PATENT DOCUMENTS
EP 1 493 965 A2 1/2005
* cited by examiner

Primary Examiner — Louis Casaregola
Assistant Examiner — Phutthiwat Wongwian
(74) Attorney, Agent, or Firm — Oliff & Berridge PLC

(57) ABSTRACT

A fuel distribution apparatus has a manifold head, a waisted portion and a nozzle head. An inlet channel is formed in a mounting surface of a casing of a jet engine. An annular inlet manifold is formed in the manifold head to receive fluid from the fuel inlet channel. Six outlet fluid passageways extend substantially tangentially away from the annular inlet manifold and open out into an annular outlet manifold. Three ports are formed in the inner wall of the annular outlet manifold and the ports are connected to fuel delivery tubes which extend away from the ports in a substantially helical fashion around the waisted portion into a nozzle head. The outlet fluid passageways are arranged to direct the fluid around the outlet manifold in a first direction and the helical fuel delivery tubes extend in the opposite direction.

19 Claims, 7 Drawing Sheets

FUEL DISTRIBUTION APPARATUS

BACKGROUND

The invention relates to a fuel distribution apparatus, particularly but not exclusively limited to a fuel distribution apparatus for use in a jet engine.

Conventional fuel injectors on many jet engines include a fuel injector mounted on an outer casing with fuel fed through an internal passage into a gallery that exits a nozzle to mix with swirled air for subsequent ignition. The fuel is merely sprayed into the swirling air.

SUMMARY

In some engines the use of a conventional air spray burner is not possible due to space constraints. Some small engines use vaporisers instead of air spray burners as a means of introducing fuel into the combustion chamber. Such vaporisers are not always appropriate and an alternative method for introducing fuel is required.

In any such apparatus it is important that an even fuel spray in the combustion chamber is achieved to reduce the risk of uneven burning which can affect engine efficiency and introduce hot streaks or hot spots on the combustor walls.

It is an object of the invention to provide an improved fuel distribution apparatus.

According to one aspect of the invention there is provided a fuel distribution apparatus comprising a body defining an inlet for receiving fuel from a fuel supply, an inlet manifold in fluid communication with the inlet, the inlet manifold having a plurality of outlet fluid passageways, the outlet fluid passageways extending from the inlet manifold to an annular outlet manifold, the outlet fluid passageways being arranged to impart a swirling motion in a first swirl direction to fuel entering the outlet manifold from the passageways so that fuel in the outlet manifold swirls around the manifold at a swirl angle in the first swirl direction, and a plurality of fuel delivery tubes in fluid communication with the outlet manifold, wherein the fuel delivery tubes swirl in an opposite direction to the first swirl direction.

The change in the swirl angle between the fuel entering the outlet manifold and exiting the manifold to enter the fuel delivery tubes ensures a more even fuel distribution to all of the fuel delivery tubes.

Preferably the fuel delivery tubes extend from the manifold at an angle different to the swirl angle of fuel in the outlet manifold.

The fuel delivery tubes preferably extend from the manifold in a different direction to the first swirl direction. The fuel delivery tubes may extend axially, parallel with the axis of the annular outlet manifold.

Further preferred features of the invention are set out in the claims appended hereto.

Preferably there is provided a fuel distribution apparatus comprising a body defining an inlet for receiving fuel, an inlet manifold having a plurality of outlet fluid passageways extending therefrom to an annular outlet manifold, the outlet fluid passageways being arranged to direct fluid into the annular outlet manifold in such a way as to cause the fluid to flow substantially circumferentially of the manifold, the manifold having a plurality of fluid exit ports formed in the radially inner wall thereof to allow fluid in the manifold to exit the manifold.

In that way, the circumferential flow of fluid tends to push the fluid outwardly against the outer wall of the manifold and the manifold tends to fill with fluid before any fluid enters the exit ports.

BRIEF DESCRIPTION OF THE DRAWINGS

A fuel distribution apparatus in accordance with the invention will now be described in detail by way of example and with reference to the accompanying drawings, in which.

DETAILED DESCRIPTION OF EMBODIMENTS

Figure 1:
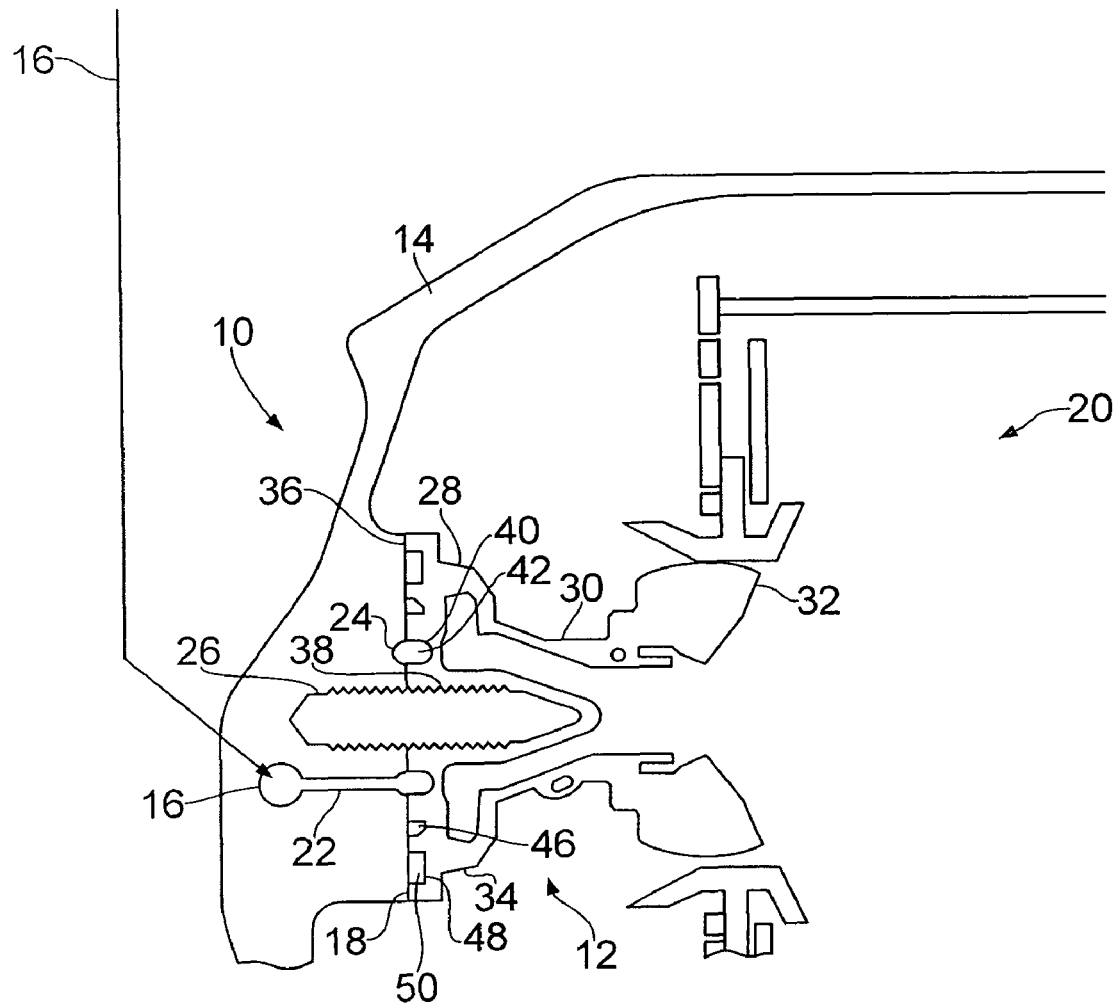
FIG. 1 is a schematic cross-section of part of a combustion system of a jet engine showing a fuel distribution apparatus in accordance with the invention.
Figure 2:
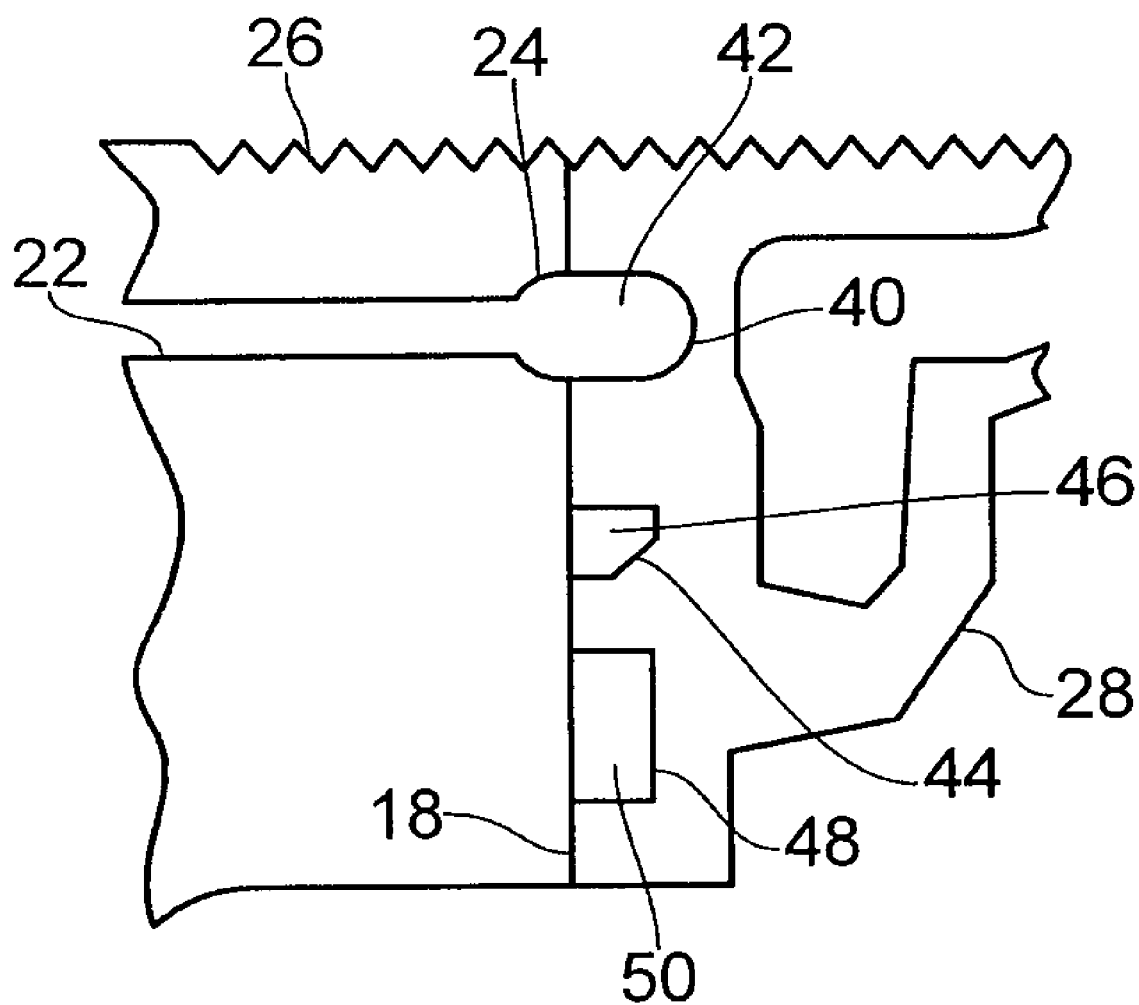
FIG. 2 is an enlarged sectional view of part of the combustion system showing part of the fuel distribution apparatus in accordance with the invention.
Figure 3:
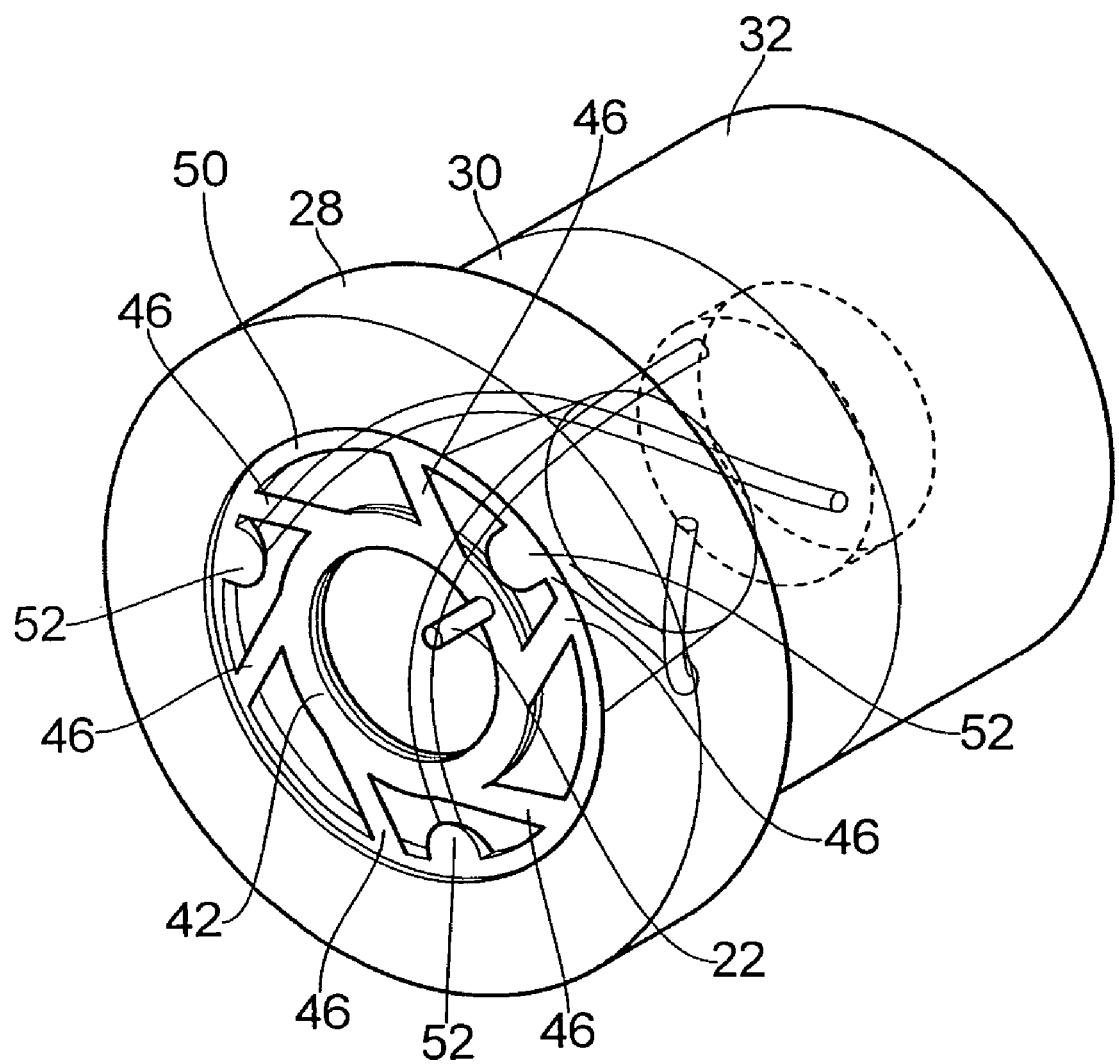
FIG. 3 is a schematic perspective view of the fuel distribution apparatus in FIGS. 1 and 2, looking from the front and one side.
Figure 4:
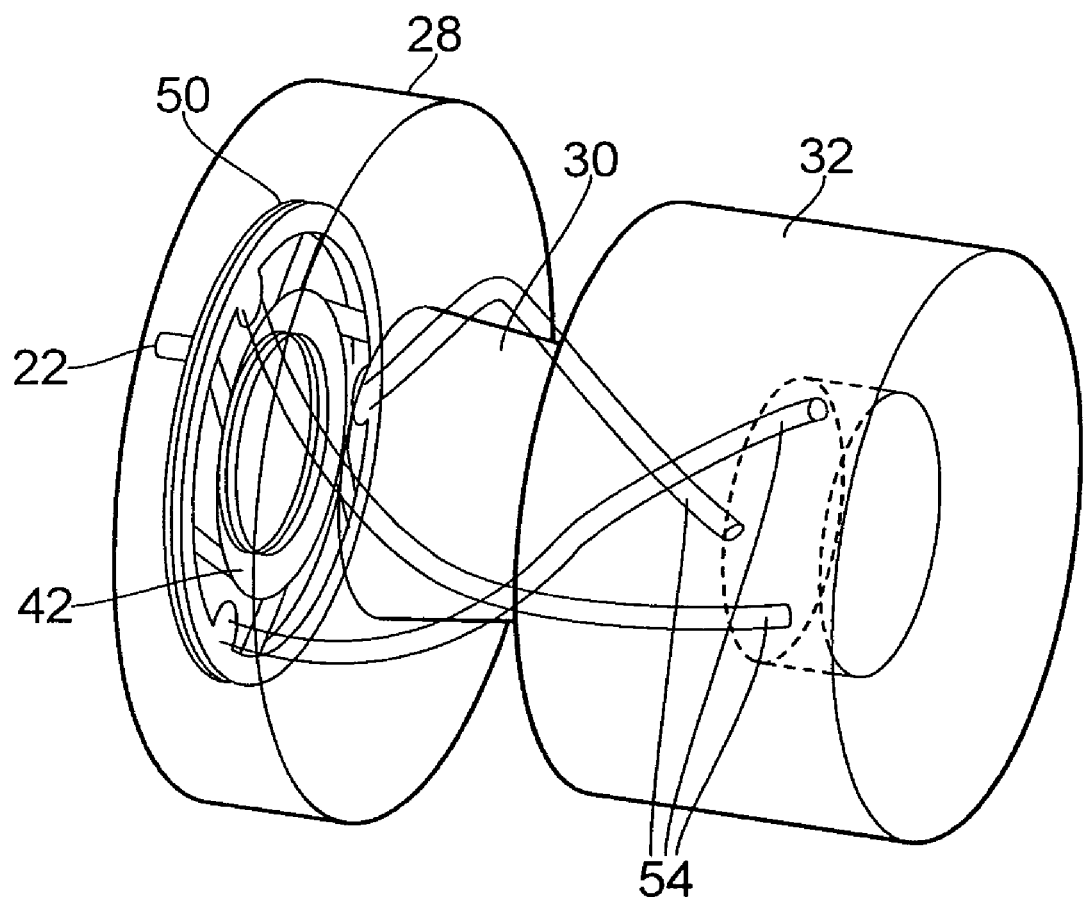
FIG. 4 is a schematic perspective view of the fuel distribution apparatus of FIG. 3 looking from the rear and said one side.

In FIG. 1 part of the combustion system 10 of a jet engine is shown incorporating a fluid distribution apparatus indicated generally at 12 in accordance with the invention.

The combustion system 10 comprises a casing 14 with a fuel line 16 (shown schematically) running from a fuel supply (not shown) to the fuel distribution apparatus 12. The casing 14 has a flat mounting surface 18 formed on the inside surface thereon facing a combustion chamber 20. The fuel line 16 terminates and is in fluid communication with fuel inlet channel 22 drilled from the mounting surface 18 into the inner part of the casing 14.

The mounting surface 18 also has an annular channel 24 machined into the surface, part of which is coincident with the point at which the fuel inlet channel 22 emerges from the body of the casing 14. Furthermore, the mounting surface 18 has a screw-threaded bore 26 formed concentrically with the annular channel 24.

The fuel distribution apparatus 12 comprises a manifold head 28, a waisted portion 30 and a nozzle head 32.

The manifold head 28 comprises a stepped cylindrical body 34 having a substantially flat face 36 at one end for arrangement against the mounting surface 18. A series of channels and passageways are machined into the surface of the face 36 so that when the face 36 is mounted against the mounting surface 18, those channels form closed fluid passageways.

A screw-threaded bore 38 is formed centrally of the stepped cylindrical body 34. The bore is substantially the same diameter as the screw-threaded bore in the mounting surface 18 and is arranged co-axially therewith when the fuel distribution apparatus 12 is mounted on the mounting surface 18.

Formed concentrically with the screw-threaded bore, an annular inlet manifold channel 40 surrounds the screw threaded bore 38. The annular inlet manifold channel 40 has the same diameter as the annular channel 24 formed in the mounting surface 18. Thus, when the fuel distribution apparatus 12 is mounted on the mounting surface 18, the annular channel 24 and the annular inlet manifold channel 40 overlay one another so as to define an annular inlet manifold 42.

In FIGS. 3-7 the channels formed in the mounting surface 18 and the manifold head 28 are shown in negative form. In other words, what is shown in FIGS. 3-7 are the spaces defined within the fuel distribution apparatus.

Six straight channels 44 are formed in the flat face 36 of the stepped cylindrical body 34. The channels 44 extend from the annular inlet manifold channel 40 substantially tangentially relative thereto. The channels are arranged at regular 60o degree intervals around the circumference of the annular inlet manifold channel 40. When closed off by the mounting surface 18 of the casing 14, the channels 44 form outlet fluid passageways 46.

An annular outlet manifold channel 48 is formed concentrically with the annular inlet manifold channel 40 in the flat face 36 of the stepped cylindrical body 34. Again, when the channel 48 is closed off by the mounting surface 18 of the casing 14, the annular outlet manifold channel 48 forms an annular outlet manifold 50. The outer ends of the outlet fluid passageways 46 open into the annular outlet manifold 50. Thus, the annular inlet manifold 42 and the annular outlet manifold 50 are connected together in fluid communication by means of the outlet fluid passageways 46. The openings of the outlet fluid passageways 46 are in the inner wall of the annular outlet manifold 50. Three ports 52 are formed in the inner wall of the annular outlet manifold 50. The ports are regularly angularly spaced at 1200 degrees relative to each other. The ports 52 are respectively arranged between pairs of outlet fluid passageways 46.

Figure 5:
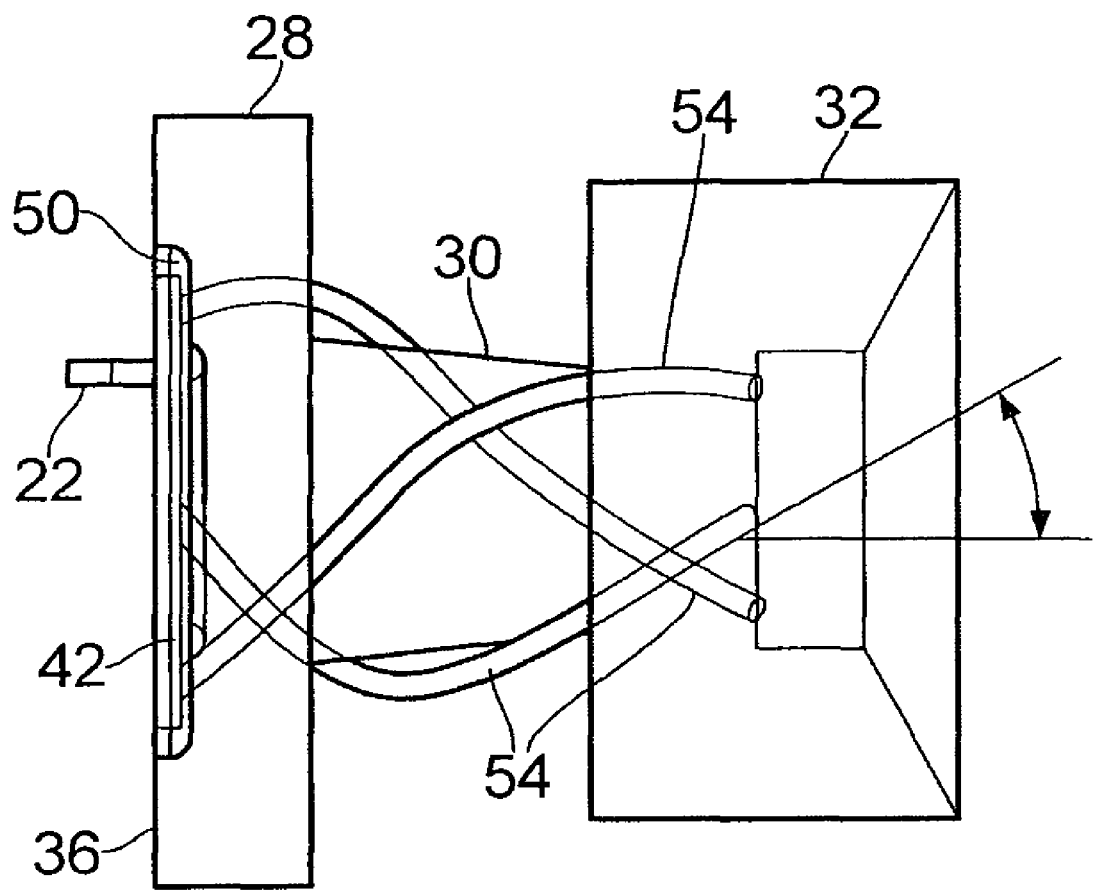
FIG. 5 is a schematic side elevation of the fuel distribution apparatus shown in FIGS. 3 and 4.

The ports 52 act as an entry for respective fluid delivery tubes 54 which extend from the ports 52 at one end thereof in a substantially helical fashion around the waisted portion 30 into the nozzle head 32. This is best shown in FIG. 5.

In the present application, the term helical shall be understood to mean the shape a line would assume if wound around a cylinder or cone.

The fuel delivery tubes 54 are arranged so that their ends in the nozzle head 32 extend at an approximately 45o degree angle relative to the axis of the device defined by the annular manifolds.

In order to assemble the fuel distribution apparatus onto the mounting surface 18, a bolt (not shown) is screwed into the screw-threaded bore 26 in the mounting surface 18 and the fuel distribution apparatus 12 is screwed on to the protruding bolt so that the bolt extends into the screw-threaded bore 38 in the stepped cylindrical body 34 of the fuel distribution apparatus.

Figure 6:
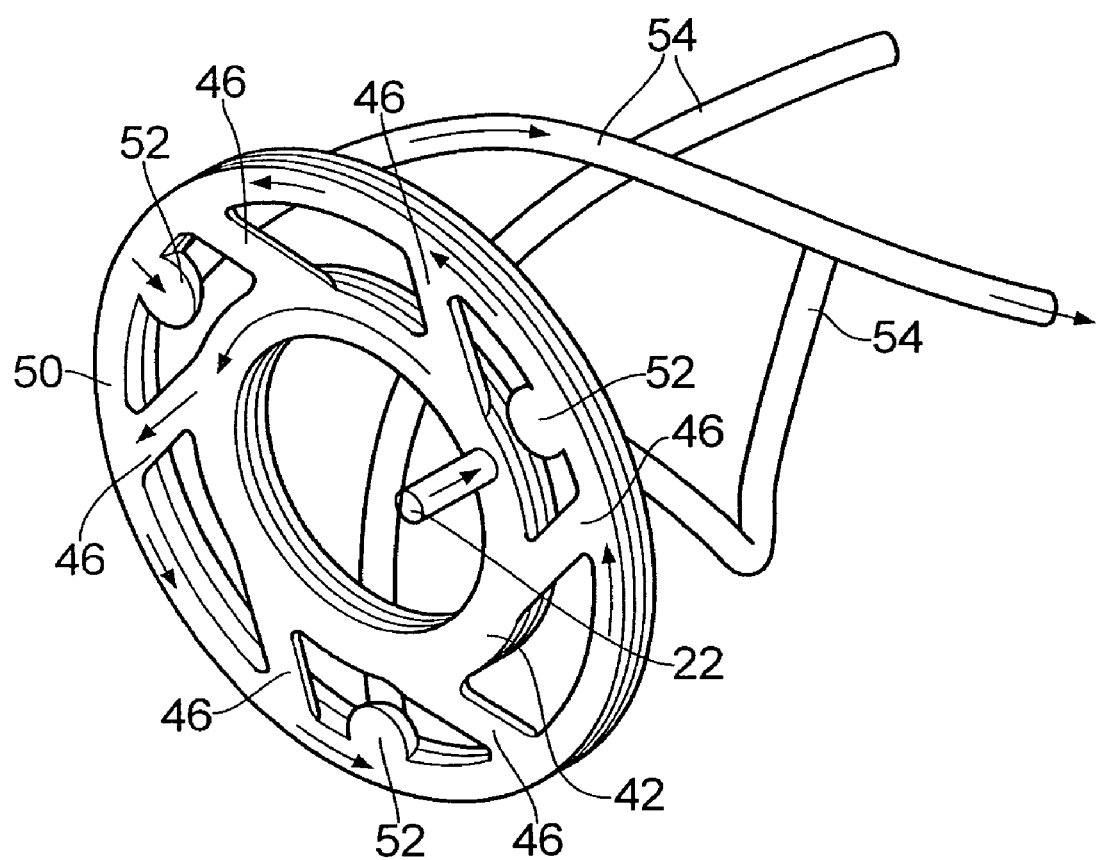
FIG. 6 is a view similar to FIG. 3 shown to a larger scale with the extraneous material of the body of the fuel distribution apparatus removed for clarity.

In use, fuel flows along the fuel line 16 as indicated in FIG. 1. The fuel line 16 terminates at one end of the fuel inlet channel 22. The fuel inlet channel 22 passes the fuel along its length to the annular inlet manifold 42 (see FIG. 6). Fuel supplied by the fuel inlet channel 22 flows around the annular inlet manifold 42 until that manifold is full. Fuel then flows out of the manifold 42 under pressure, along the outlet fluid passageways 46 and into the annular outlet manifold 50. Again, fuel flows around the annular outlet manifold 50 and the tangential arrangement of the outlet fluid passageways 46 introduces a swirling motion to the fuel in the annular outlet manifold 50. The fuel swirls around the annular outlet manifold 50 in an anti-clockwise direction as shown in FIG. 6. Due to the swirl induced in the fluid, the fluid tends to flow around the outer wall of the annular outlet manifold 50 until that manifold is filled with fuel. At that point the fuel can enter the ports 52 and then flow along the fuel delivery tubes 54. Because the ports 52 are formed in the inner wall of the annular outlet manifold 50, because the fuel is swirling around the outlet manifold being pushed towards the outer wall of the manifold 50 and because the path that the fuel must take on entry into the ports and along the fuel delivery tubes is at a different swirl angle, the apparatus ensures that there is an even distribution of fuel between the three fuel delivery tubes 54. That means that fuel is evenly distributed to the nozzle 54 which reduces the propensity for hot spots to occur in the combustion chamber 20.

Figure 7:
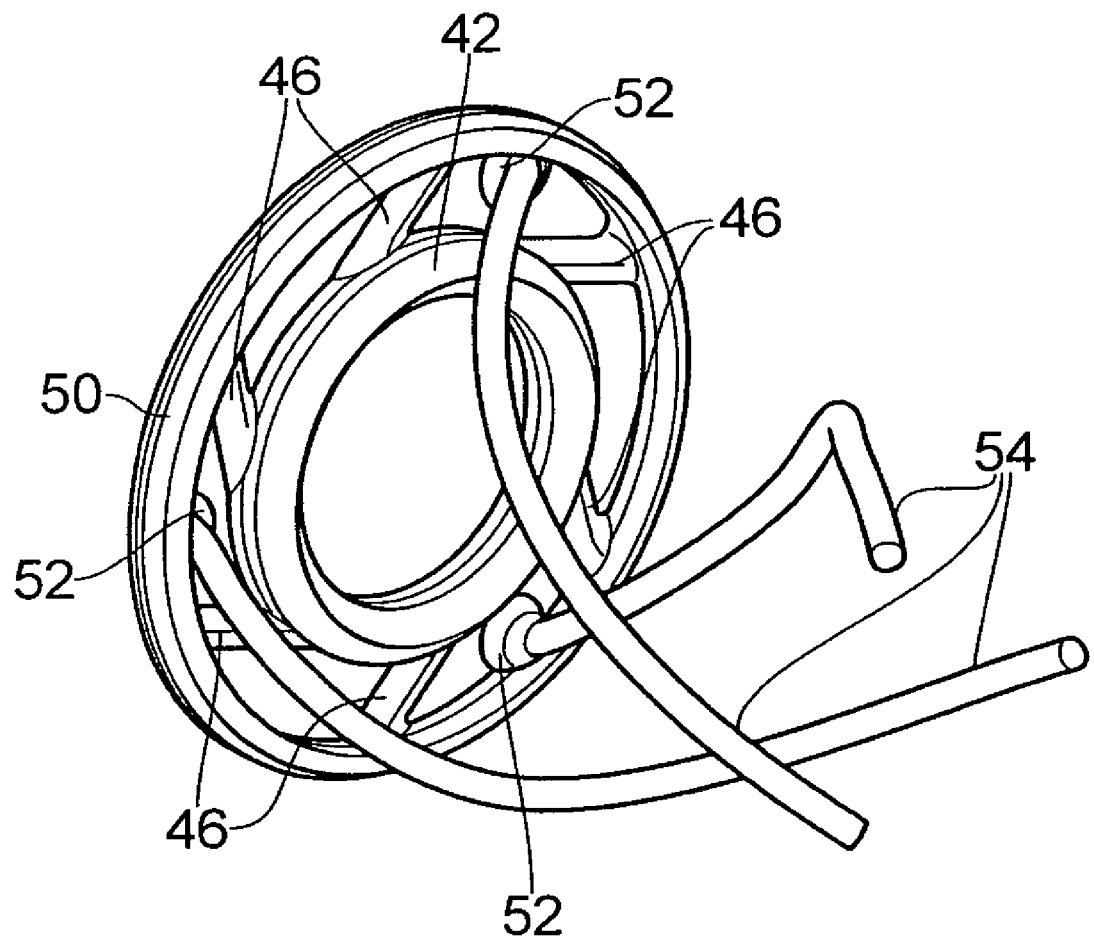
FIG. 7 is a view from the rear and said one side of the fuel distribution apparatus of FIG. 6, again with the body material removed for clarity.

As can be seen in FIGS. 6 and 7, the fuel delivery tubes 54 follow a helical path which is travelling in the opposite rotational direction to the rotational direction imparted to fuel travelling around the annular outlet manifold 50 by the orientation of the outlet fluid passageways 46. Looking at the FIG. 6 arrangement, fuel is arranged to flow in anti-clockwise direction around the annular outlet manifold 50 and fuel then flows in a clockwise direction in the fuel delivery tubes 54. This change in direction effects more even fuel distribution between the tubes.

Also, the orientation of the port on the inner wall of the annular outlet manifold 50 ensures that the annular outlet manifold is more fully pressurised with fuel before fuel enters the ports 52. This, also, facilitates more even fuel distribution between the fuel delivery tubes 54.

The fuel that travels along the fuel delivery tubes 54 emerges into the nozzle head 32 to be mixed with air prior to ignition in the combustion chamber 20.

Although six fluid passageways and three fuel delivery tubes are shown, an alternative plural number of each may be used where appropriate. It is preferable that the tubes and/or passageways are regularly angularly spaced around the manifolds. Also, a two to one relationship between passageways and tubes is preferable but not essential.

The invention claimed is:

1. A fuel distribution apparatus that receives fuel from a fuel supply, the apparatus comprising:
    a body defining an inlet for receiving the fuel from the fuel supply;
    an inlet manifold in fluid communication with the inlet, the inlet manifold having a plurality of outlet fluid passageways;
    an annular outlet manifold, the outlet fluid passageways extending from the inlet manifold to the annular outlet manifold, the outlet fluid passageways being arranged to impart a swirling motion in a first rotational direction to fuel entering the outlet manifold from the passageways so that fuel in the outlet manifold swirls around the manifold at a swirl angle in the first rotational direction; and
    a plurality of fuel delivery tubes in fluid communication with the outlet manifold, wherein the fuel delivery tubes are disposed in an opposite rotational direction to the first rotational direction.

2. The fuel distribution apparatus of claim 1, in which the fuel delivery tubes extend from the outlet manifold at an angle different to the swirl angle of fuel in the outlet manifold.

3. The fuel distribution apparatus of claim 2, in which the fuel delivery tubes extend axially, with respect to the axis of the annular outlet manifold.

4. The fuel distribution apparatus of claim 1, in which the inlet manifold is inward of the outlet manifold.

5. The fuel distribution apparatus of claim 1, in which the inlet manifold is an annular manifold.

6. The fuel distribution apparatus of claim 5, in which the outlet fluid passageways extend substantially tangentially away from the annular inlet manifold.

7. The fuel distribution apparatus of claim 1, in which there are from three to six outlet fluid passageways.

8. The fuel distribution apparatus of claim 1, in which there are six outlet fluid passageways.

9. The fuel distribution apparatus of claim 1, in which the inlet opens out into the inlet manifold at a point spaced between outlet fluid passageways.

10. The fuel distribution apparatus of claim 1, in one or more of the inlet manifold, the outlet passageways and the outlet manifold are formed in the surface of the body and closed off by abutment against another surface.

11. The fuel distribution apparatus of claim 1, in which the body is formed in two parts, the inlet is formed in one part and the inlet manifold is formed in the other part.

12. The fuel distribution apparatus of claim 11, in which the two parts are connected together by means of a screw-threaded attachment.

13. The fuel distribution apparatus of claim 1, further comprising a nozzle head in which the fuel delivery tubes terminate in the nozzle head to effect mixing with air prior to ignition.

14. The fuel distribution apparatus of claim 13, in which the nozzle head is arranged co-axially with the annular outlet manifold and the fuel delivery tubes extend at an angle 45° degrees relative to that axis as they terminate in the nozzle head.

15. The fuel distribution apparatus of claim 1, in which the fuel delivery tubes extend in a substantially helical path away from the annular outlet manifold.

16. The fuel distribution apparatus of claim 15, in which the rotational direction of the helical path is opposite to the rotational direction imparted to the fluid in the annular outlet manifold.

17. The fuel distribution apparatus of claim 1, in which three fuel delivery tubes are provided.

18. The fuel distribution apparatus of claim 1, in which the entry to the fuel delivery tubes is provided on a radially inner wall of the outlet manifold.

19. The fuel distribution apparatus of claim 1, in which each fuel delivery tube has a pair of outlet fluid passageways arranged on either side.

* * * * *